(12) United States Patent
Kojic et al.

(10) Patent No.: US 12,291,151 B2
(45) Date of Patent: May 6, 2025

(54) LIFTGATE REAR CAMERA SYSTEM AND METHOD THEREOF

(71) Applicants: Mladen Kojic, Council Bluff, IA (US); Peter Dunlop, Woodbine, IA (US)

(72) Inventors: Mladen Kojic, Council Bluff, IA (US); Peter Dunlop, Woodbine, IA (US)

(73) Assignee: BUS BROWN, INC., Scottsdale, AZ (US)

(*) Notice: Subject to any disclaimer, the term of this patent is extended or adjusted under 35 U.S.C. 154(b) by 75 days.

(21) Appl. No.: 17/962,064

(22) Filed: Oct. 7, 2022

(65) Prior Publication Data
US 2023/0114204 A1 Apr. 13, 2023

Related U.S. Application Data

(60) Provisional application No. 63/253,320, filed on Oct. 7, 2021.

(51) Int. Cl.
| | |
|---|---|
| *B60R 1/26* | (2022.01) |
| *B60J 5/10* | (2006.01) |
| *B60R 11/04* | (2006.01) |
| *H04N 23/51* | (2023.01) |
| *B60R 11/00* | (2006.01) |

(52) U.S. Cl.
CPC .............. *B60R 1/26* (2022.01); *B60J 5/107* (2013.01); *B60R 11/04* (2013.01); *H04N 23/51* (2023.01); *B60R 2011/004* (2013.01); *B60R 2011/0043* (2013.01); *B60R 2011/0085* (2013.01)

(58) Field of Classification Search
CPC ........ B60P 1/4414–4421; B60P 1/4435; B60R 11/04
See application file for complete search history.

(56) References Cited

U.S. PATENT DOCUMENTS

| | | | | |
|---|---|---|---|---|
| 5,673,960 | A | * | 10/1997 | Sorensen .............. B60P 1/4492 296/57.1 |
| 9,963,085 | B2 | * | 5/2018 | Smith ..................... B60R 11/04 |
| 10,179,550 | B1 | | 1/2019 | Ectors |
| 2002/0197142 | A1 | | 12/2002 | Anderson et al. |
| 2004/0124659 | A1 | | 7/2004 | Vaitus et al. |
| 2006/0171704 | A1 | | 8/2006 | Bingle et al. |
| 2009/0122141 | A1 | | 5/2009 | Nakamura |
| 2017/0050551 | A1 | | 2/2017 | Smith et al. |

(Continued)

OTHER PUBLICATIONS

Tommy Gate G2 Owner's manual, Archive.org http://www.tommygate.com/media/524511/009120-14_g2seriesownersmanual.pdf, dated Oct. 20, 2016 (Year: 2016).*

(Continued)

*Primary Examiner* — Leon W Rhodes, Jr.
(74) *Attorney, Agent, or Firm* — Kutak Rock LLP (57) ABSTRACT

A liftgate with rearward facing camera is provided. The rearward facing camera is positioned on the liftgate such as to comply with manufacturer recommended placement guidelines. The liftgate is moveable between stowed and deployed configurations, and the rearward facing camera is protected from damage when the liftgate is in the deployed configuration. The camera assemble includes at least one protective element. Accommodation is made for the routing and protection of wiring associated with the camera.

16 Claims, 8 Drawing Sheets

(56) References Cited

U.S. PATENT DOCUMENTS

| | | |
|---|---|---|
| 2017/0129419 A1 | 5/2017 | Conger et al. |
| 2021/0170959 A1 | 6/2021 | Carmenaty |

OTHER PUBLICATIONS

YouTube video by CrazyMotor Master titled "Ford Truck Back-Up Camera Install (Tailgate Handle)", https://www.youtube.com/watch?v=0BuVNtCaXSk, screenshots of relevant portions attached (Year: 2017).*

"etrailer.com, Backup Camera Relocation Kit for Husky Liners Premium 5th Wheel Louvered Tailgate—Ford Super Duty Husky Liners Accessories and Parts HL 15138, Dec. 15, 2013."

"FJCruiserForums.com, FJ Cruiser 2009 stock (OEM) rear camera location, Nov. 13, 2008."

"Ford Truck Enthusiasts, Backup Camera With Tommy Lift, Feb. 28, 2011."

"HeartlandOwners.org, Ford F250 Back Up Camera Relocation, Jan. 28, 2014."

"Notice of Allowance received for U.S. Appl. No. 15/199,467, Mailed on Mar. 5, 2018".

"Ram1500Diesel.com, Moving Backup Camera from Tail Gate, Sep. 16, 2014."

"RAMForum.com, Relocating back up camera?, May 5, 2014".

"Scottmarlow.net, HID Lighting by Delta Lights JEEP 1-866-761-0974 Free Shipping, Aug. 9, 2013."

"TacomaWorld.com, Regarding the backup camera on the tailgate . . . , Jan. 6, 2012."

"Travels with Rocky the Dog, Relocated Back-up Camera, Jun. 19, 2012."

"YouTube.com, sussexinstallations, Mercedes Sprinter 2014 Hope T Bar and Front and Rear Parking Sensors, Jun. 17, 2014."

"Non-Final Office Action received for U.S. Appl. No. 16/890,447, mailed on Jul. 14, 2022."

* cited by examiner

LIFTGATE REAR CAMERA SYSTEM AND METHOD THEREOF

CROSS-REFERENCE TO RELATED APPLICATIONS

This application claims priority pursuant to 35 U.S.C. 119 (e) to U.S. Provisional Patent Application Ser. No. 63/253,320, filed Oct. 7, 2021, the entire disclosure of which is incorporated herein by reference.

FIELD OF THE INVENTION

The present invention relates generally to liftgates and vehicle safety systems. More specifically, the present invention is concerned with rearward facing cameras positioned on the platform portion of a liftgate and the installation of such cameras.

BACKGROUND

Tail lifts, or liftgates, are mechanical devices permanently installed on the rear of a work truck, van, or lorry, and is designed to facilitate the materials handling of goods from ground level or a loading dock to the level of the vehicle bed, or vice versa. Modern vehicles with a gross axle weight rating (GWR) less than 10,000 lbs. come with a camera designed to be mounted in the tailgate or the rear of the vehicle. The manufacturer for the vehicle has a recommended zone in which the rear mounted camera is preferably located for proper functioning of the camera. When installing a liftgate onto such vehicles, the typical or standard area to mount this camera and/or the wiring path is blocked by structural members of the platform, moving parts, and/or a license plate. Due to these obstructions, the camera often ends up mounted outside the manufacturer recommended zone, thus requiring additional testing by bracket designers and the final stage manufacturer to ensure compliance with rear visibility standards.

In addition, vehicles often have features beyond the minimum requirements which may be affected by positioning the camera far away from its original location. For example, many vehicles superimpose guidelines on the screen to mark the area directly behind the vehicle, and these guidelines may no longer be accurate if the camera has been relocated to a significantly different position.

Accordingly, it would be advantageous to have a system of and method for installing or placing a rearward facing camera on a liftgate in a manner which is not obstructive of the wiring and mounting paths, which meets visibility requirements, and which accommodates additional features associated with the camera and a camera assembly.

SUMMARY

The present invention comprises a liftgate assembly, which in some embodiments includes a camera assembly. The liftgate assembly is configured to be installed on the back of a vehicle, oftentimes a truck. The liftgate assembly includes a platform which is movable between stowed and deployed configurations. The platform includes a plurality of structural members, such as vertical and horizontal structural members, which generally run along a perimeter of the platform and are spaced intermittently along the interior of the platform to provide bracing support along an interior surface of the platform. The interior of the platform, along with the various structural members, includes a plurality of mounting points and/or receiving elements which are configured to securing a camera assembly. The camera assembly includes one or more of a rear-view camera, a mounting bracket, a protective element, a camera cover, a wiring harness, and the like.

The plurality of mounting points are configured such as to accommodate a wide array of placement of the camera assembly on the platform of the liftgate, such that the camera assembly is able to be placed on the platform resulting in a camera position and angle which is relatively close to the manufacturer's suggested location for the rear-view camera. The mounting plate include a plurality of fasteners or securing elements which are configured to align with one or more combination of receiving elements of the liftgate platform. Moreover, one of a plurality of mounting plates may be selected based on the vehicle and install of the liftgate assembly to ensure the ability to place the camera in the manufacturer's suggested location. Moreover, the camera assembly may include one or more adjustment mechanism which can be utilized to fine-tune the positioning and/or the angle of the camera. Advantageously, this provides a large number of mounting options and locations for the camera assembly, enabling the system to position the camera within the manufacturer's recommended location for a wide variety of vehicle makes and models.

The camera assembly includes, in some embodiments, one or more additional elements, such as additional mounting plates, a camera cover, a protective element, a wiring harness, and the like. The various receiving element and mounting points associated with the liftgate accommodate these various elements. For example, a protective element may be positioned along mounting points of the liftgate top structural element which provides impact protection for the camera assembly. Advantageously, this allows for the selective inclusion of various elements of the camera assembly as needed by the particular installation and working environment.

The platform includes opposing top and bottom edges and opposing left and right edges, each of the edges comprising a structural member. The platform at one or more of the structural members is, in some embodiments, connected to one or more riser associated with the liftgate assembly. These edges form the perimeter of a, interior section of the platform, the interior section having interior and exterior surfaces. One or more additional structural members, in some embodiments, are positioned running either between the top and bottom edges or the left and right edges and provide additional support to the interior section of the platform. In some embodiments, the interior surface includes one or more depression or guide path to accommodate the routing of one or more wiring assembly and/or bundle along the platform. In some embodiments, the routing is proximate one or more of the edges, such as proximate a top edge, and in some embodiments the routing is proximate one or more vertical structural member. In some embodiments, one or more structural members include internal routing paths and/or conduits through which one or more wiring bundle is passed to route the wiring into the vehicle's electrical circuit. Even further, in some embodiments one or more risers includes a routing path, such as a depression or guide or internal routing path. Advantageously, this provides wiring paths that are internal to the platform and/or routed close to the structural members of the platform and therefore does not require the use of exposed wiring harnesses and bundles along the interior surfaces of the platform or wiring paths which may impede the use and function of the liftgate.

Moreover, this offers protection to the wiring, which is often susceptible to damage resulting from day-to-day use.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention and various features thereof.

BRIEF DESCRIPTION OF THE DRAWINGS

A preferred embodiment of the invention, illustrative of the best mode in which the applicant has contemplated applying the principles, is set forth in the following description and is shown in the drawings and is particularly and distinctly pointed out and set forth in the appended claims.

DETAILED DESCRIPTION

As required, a detailed embodiment of the present invention is disclosed herein; however, it is to be understood that the disclosed embodiment is merely exemplary of the principles of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to FIGS. 1-7, a liftgate assembly 100 is considered. In some embodiments, the liftgate assembly 100 includes rearward facing camera as part of a camera assembly 200 mounted to a liftgate assembly 100. The liftgate assembly 100 is configured to be positionable and mounted onto the rear of a vehicle, such as a truck. It will be appreciated that while the description references the liftgate assembly 100 mounting to a truck, however one of ordinary skill would appreciate that the liftgate assembly 100 described herein may be mounted on a wide variety of different vehicles, both residential and commercial alike. The liftgate assembly 100 is positioned proximate the tailgate of the truck, or in some embodiments, the liftgate assembly 100 itself replaces the tailgate of the truck. In some embodiments, the liftgate assembly 100 is operable to move between a stowed position and a deployed position. The stowed position is typically positioned vertically and serving as a tailgate of the vehicle. The deployed position is positioned away from the rear end of the vehicle both to enable the use of the lifting features of the liftgate assembly 100 and to provide access to the interior of the vehicle (e.g., to provide access to a storage area located within the vehicle).

In some embodiments, the liftgate assembly 100 includes a platform 110 which is movable between a stowed configuration and a deployed configuration. In some embodiments, while in the stowed position, the liftgate assembly 100 and/or the platform 110 is oriented in a vertical position such that a top portion or top structural element 114 of the platform is relatively higher than a bottom portion or structural element 113 of the platform.

In some embodiments, the liftgate assembly 100 includes one or more camera assembly 200. In some embodiments, the camera assembly 200 includes a camera 210 (which in some embodiments is referred to as a rear-view camera), the camera 210 being mounted towards a relative top portion of the liftgate assembly 100 and/or platform 110. In some embodiments, the camera assembly 200 is mounted to the platform 110 such that the camera is positioned near where most pickup trucks put their rear facing camera. In some embodiments, this position is set forth by the manufacturer of the vehicle, which establishes the proper placement of the rear-view camera along with the proper angle of the camera relative to the ground. In some embodiments, the camera assembly 200 includes a mount 220 which is adjustable and/or a plurality of interchangeable mounts which provide different camera locations and angles. This ensures the camera 210 can be mounted in, or relatively close to, the manufacturer's recommended zone and allows for the rear-view camera 210 to function as intended and/or to function in a manner that complies with the requirements set forth by the manufacture of the vehicle.

In some embodiments, the platform 110 is comprised of one or more structural members (114, 115, 116) which form a perimetral wall and an interior structure 112, the interior structure 112 including interior and exterior surfaces. The perimetral wall comprises, in some embodiments, a top structural element 114 and a bottom structural element 114, along with opposing left and right structural elements 116.

In some embodiments, while in the stowed position, a first surface of the platform 110 is positioned in a vertical orientation, such that a first edge of the platform 110 is understood as a top edge of the platform 110. The first surface faces a first direction, which in some embodiments is a direction away from the body of the vehicle, such that the platform 110 in the stowed position appears as a tailgate of the vehicle. In some embodiments, a support member or support element is associated with or makes up the first edge of the first surface that is considered the top edge of the platform 110.

In some embodiments, while in the deployed configuration, the first surface of the platform 110 is positioned in a horizontal orientation, such that the first edge is now understood as a front edge of the platform 110. In some embodiments, the first surface faces a second direction while in the deployed configuration, which in some embodiments is a direction facing downwards, such that the platform 110 appears as a horizontal surface which is suitable for other objects to be placed upon.

In some embodiments, moving the liftgate assembly 100 from the stowed configuration to the deployed configuration involves rotating the platform 110 about a fixed point. In some embodiments, the platform 110 is rotated about a lower portion of the platform, which in some embodiments is a bottom edge or a structural member 115 associated with the bottom edge of the platform. In some embodiments, the liftgate assembly 100 may be moved from a stowed configuration to a deployed configuration by a user moving a handle from a first position to a second position. The handle may be attached to the liftgate assembly 100 at or about a hinge, and the user may rotate the handle about the hinge to move the liftgate assembly 100 between the stowed and deployed configurations. In some embodiments, the liftgate assembly 100 may include a release mechanism that the user may actuate to release the liftgate assembly 100 from the stowed configuration. The release mechanism may include, for example, a lever, button, or switch. Once the release mechanism is actuated, the user may rotate the handle about the hinge to move the liftgate assembly 100 to the deployed configuration. In some embodiments, a single release mechanism is considered, while in some embodiments a plurality of release mechanisms is provided, such as opposing pins.

In some embodiments, while in the deployed configuration, the liftgate platform 110 is movable between raised and lower positioned. In some embodiments, one or more riser 120 is included with the liftgate assembly 100, typically secured to the frame of the vehicle, and positioned proximate left and right sides and/or structural members 116 of the platform 110. A mechanical means is connected to an electrical motor or other device that can be controlled by the user to move the platform 110 vertically, such as risers 120. The motor is typically located on the vehicle and operably connected to the platform 110 via a mechanical means. In some embodiments, the platform 110 is operably connected to the riser 120 via a pair of upper and lower supports. The supports are connected to the platform and the riser and extend between the platform and the riser to allow the platform to move vertically while the platform is attached to the riser. In some embodiments, one or more of the supports is detachable or selectively coupled, such as to provide a way for one end of the platform 110 to be detached from the riser to enable movement between stowed and deployed configurations by rotating around the other connection point.

In some embodiments, the platform 110 has a leading edge, where the leading edge is the edge which is positioned closest to the ground when the platform 110 is in the deployed configuration. In some embodiments, the platform 110 has a trailing edge which is positioned furthest from the ground when the platform is in the deployed configuration. In some embodiments, the leading edge comprises the portion of the top structural member 114 which is closest to the ground while the trailing edge comprises the portion of the top structural member 114 which is further from the ground when the platform is in the deployed configuration. In some embodiments, the assembly further includes one or more protective member 230 which serves as the leading edge.

In some embodiments, a camera assembly 200 is mounted to one or more support element (114, 115, 116), at least partially. In some embodiments, the camera assembly 200 is mounted at least partially to both the interior surface 112 of the platform 110 and a support element. The camera assembly 200 includes at least a camera 210 and a mounting bracket 220 for the camera. The camera assembly 200, in some embodiments, includes an adjustable camera mount allowing the operator or other user (e.g., a driver) to capture images and/or video at different angles. For example, the adjustable camera mount is adjustable about an axis perpendicular to the first surface. In another embodiment, the adjustable camera mount is adjustable about an axis parallel to the first surface. In yet another embodiment, the adjustable camera mount has more than one degree of freedom and is adjustable along both perpendicular and parallel axes.

In some embodiments, the camera assembly 200 further includes an adjusting member disposed within the camera assembly (such as attached to the camera and/or the mount) and operable to rotate the mount and thereby adjust the position of a camera with respect to the support element. In these embodiments, a user may rotate the adjusting member when actually performing a maneuver (e.g., getting image feedback from the camera) or from a separate location (such as from the driver and passenger cabin). The adjusting member may also be used for rough fine-tuning about a certain desired setting as well as for complete repositioning of the camera relative to the support element.

In some embodiments, at least one of the support element and the first surface include one or more receiving element, each receiving element including one or more mounting points. In some embodiments, the one or more receiving element is configured to receive an engagement element, such as an engagement element associated with a camera assembly or one or more parts of the camera assembly 200, such as a bracket, a wiring harness(es), mount, or the like. In some embodiments, the one or more receiving element is configured to hold, retain, and in some embodiments aim a rear camera assembly and wiring harness(es). In some embodiments, the aim and position of the camera are adjustable after the camera has been engaged with one or more mount, such as by an adjustment mechanism that is present in the receiving element.

Figure 1:
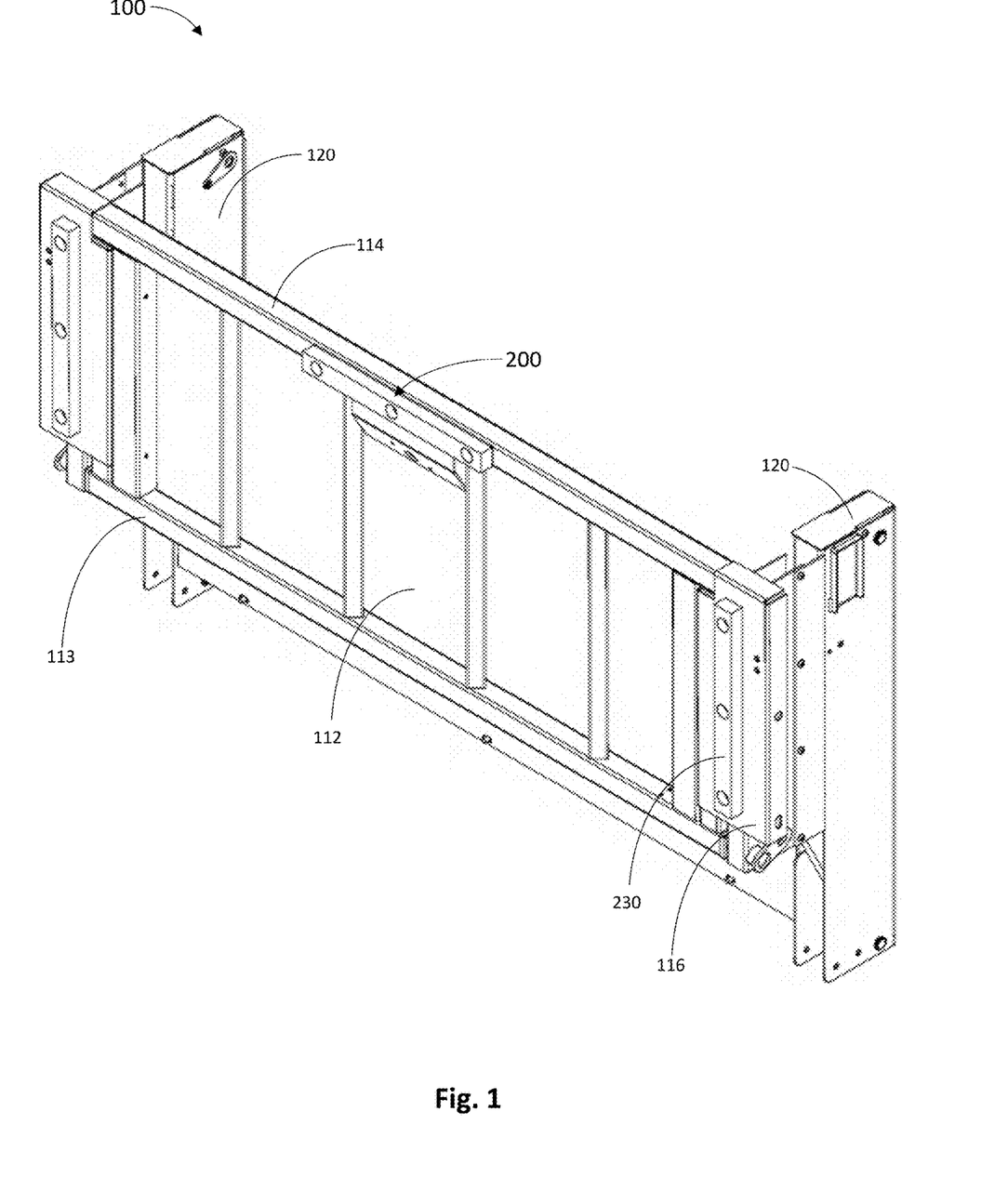
FIG. 1 is a perspective view of a liftgate assembly with a rearward facing camera according to one embodiment of the present invention.
Figure 2:
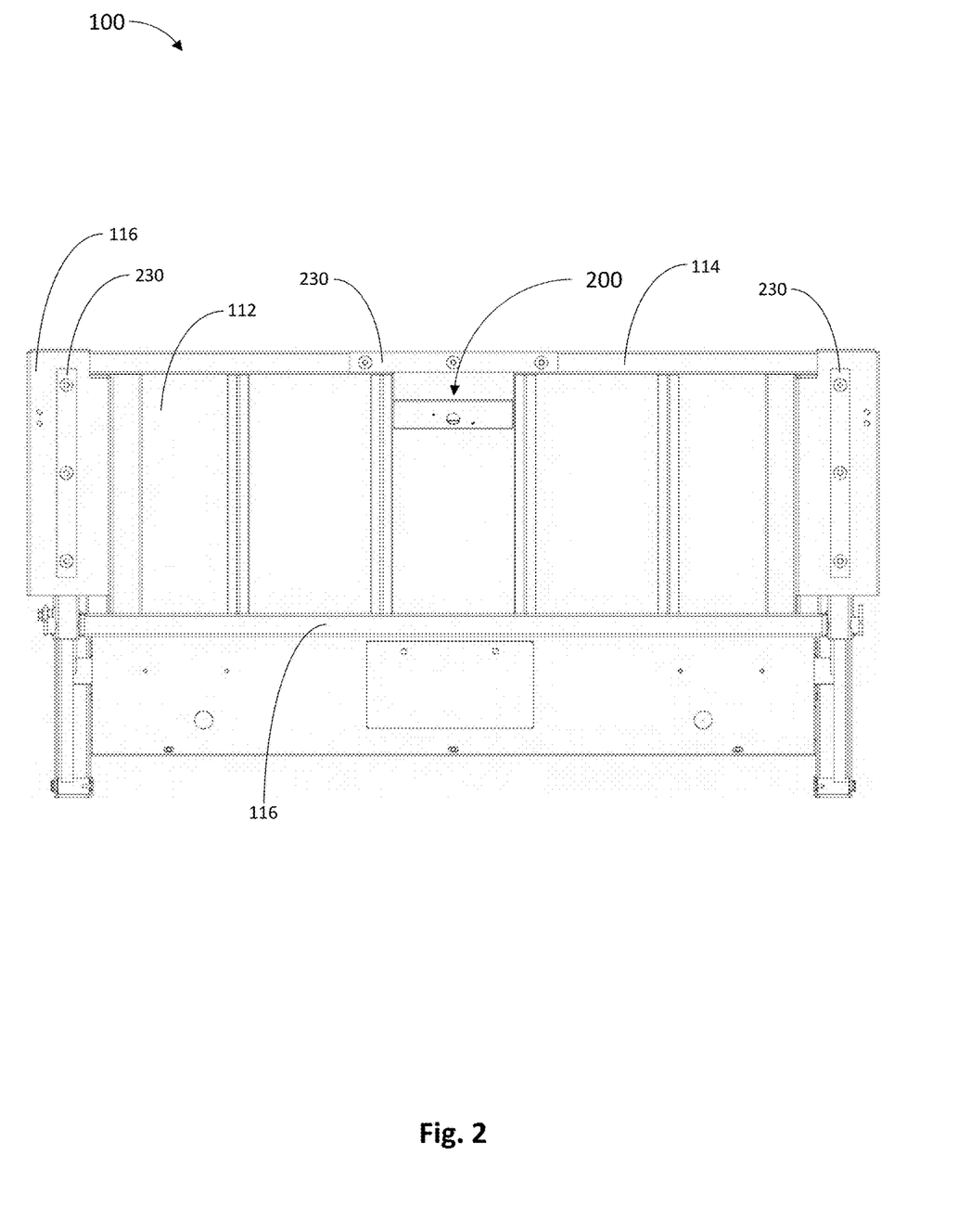
FIG. 2 is a front elevation view of the liftgate assembly of FIG. 1.
Figure 3:
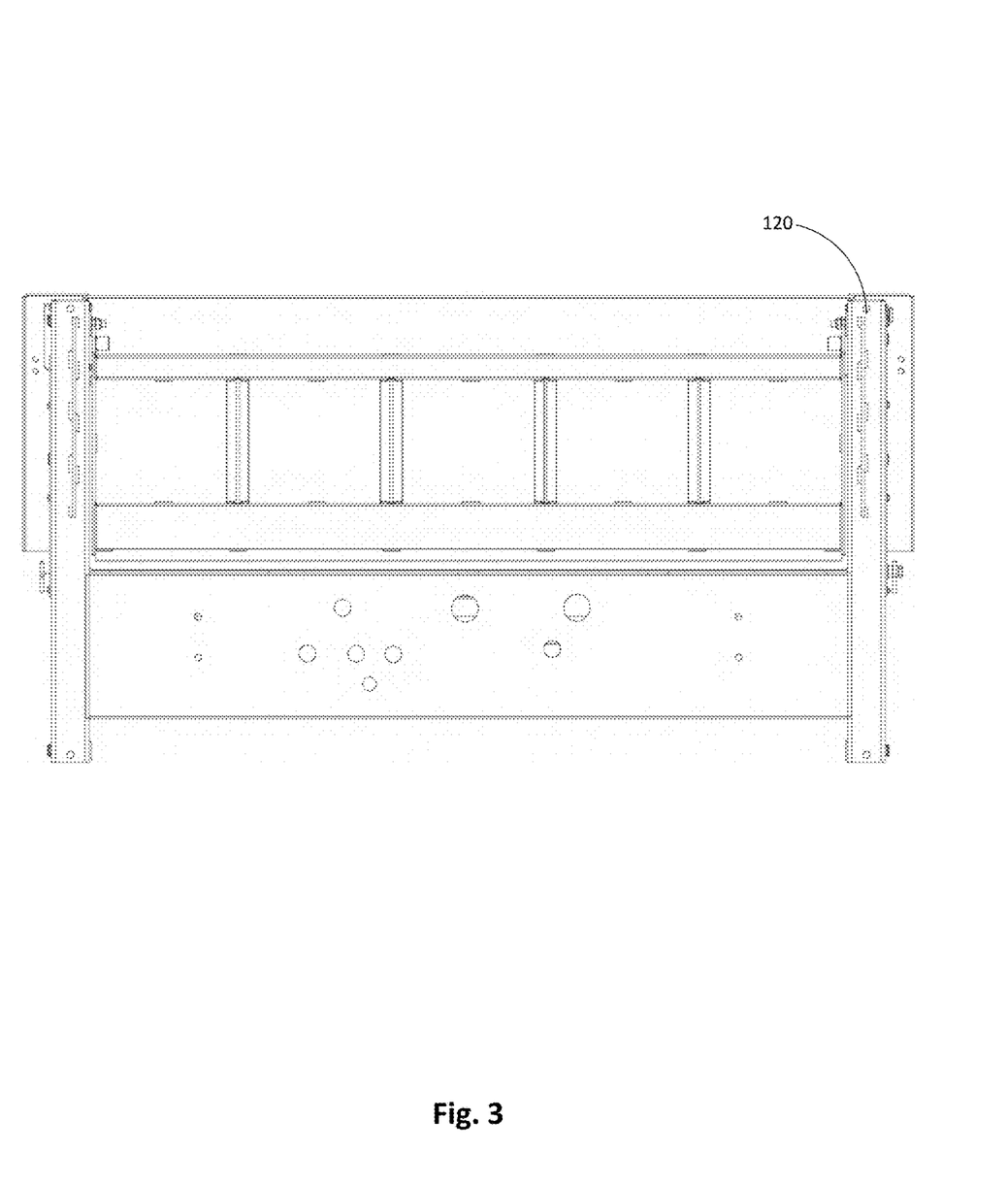
FIG. 3 is a rear elevation view of the liftgate assembly of FIG. 1.
Figure 4:
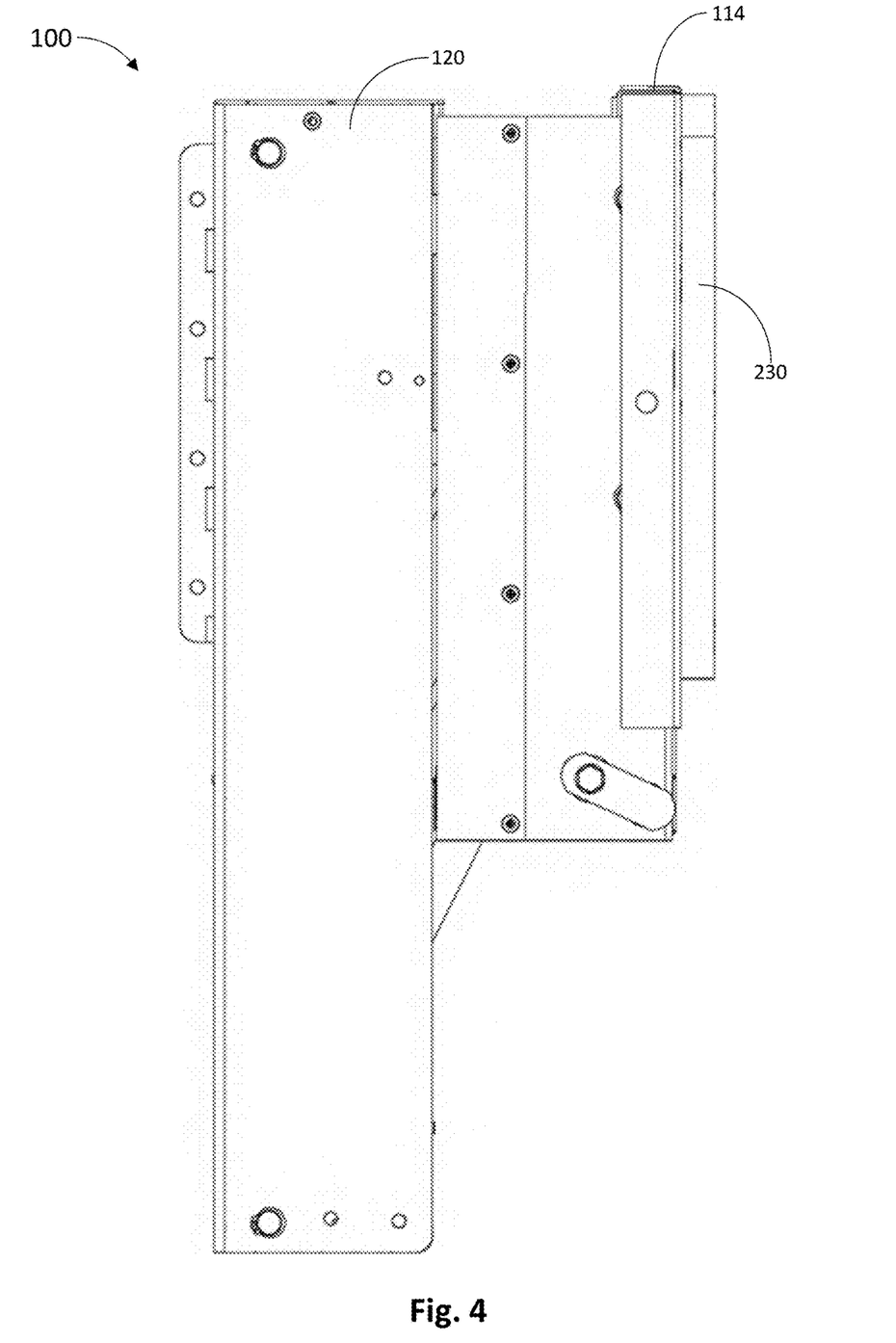
FIG. 4 is a left-side elevation view of the liftgate assembly of FIG. 1.
Figure 5:
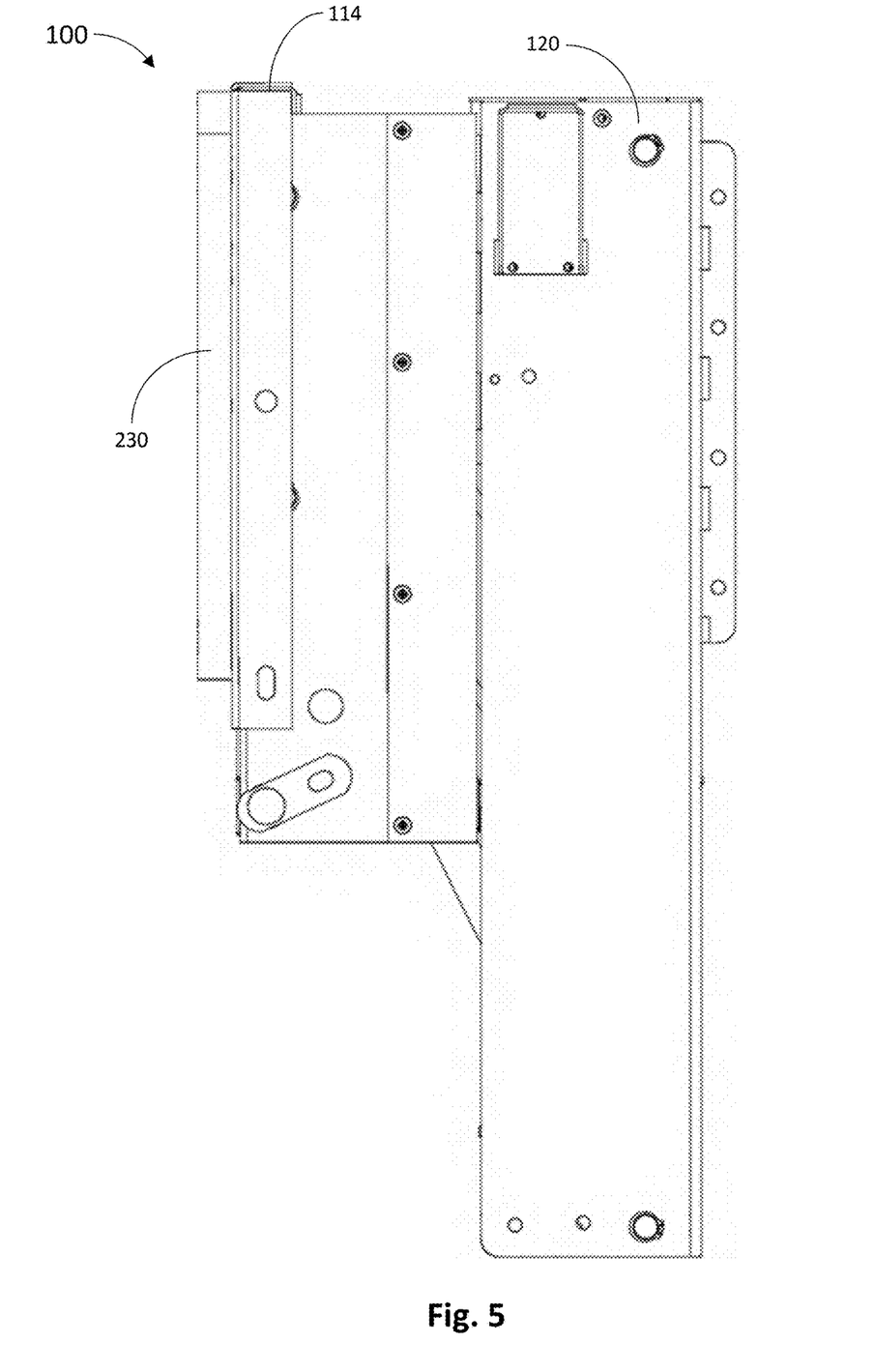
FIG. 5 is a right-side elevation view of the liftgate assembly of FIG. 1.
Figures 6, 7:
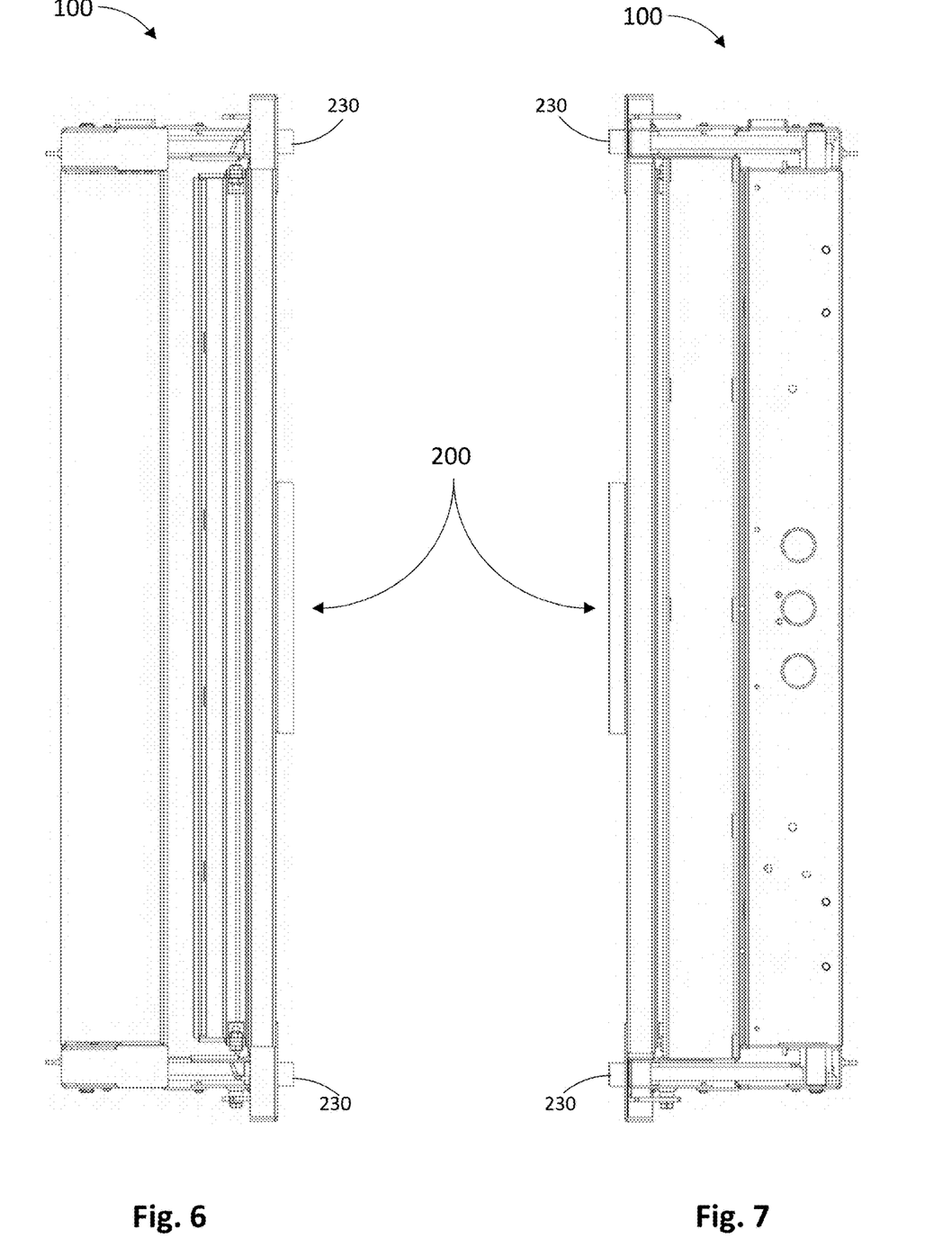
FIG. 6 is a top plan view of the liftgate assembly of FIG. 1.
FIG. 7 is a bottom plan view of the liftgate assembly of FIG. 1.
Figure 8:
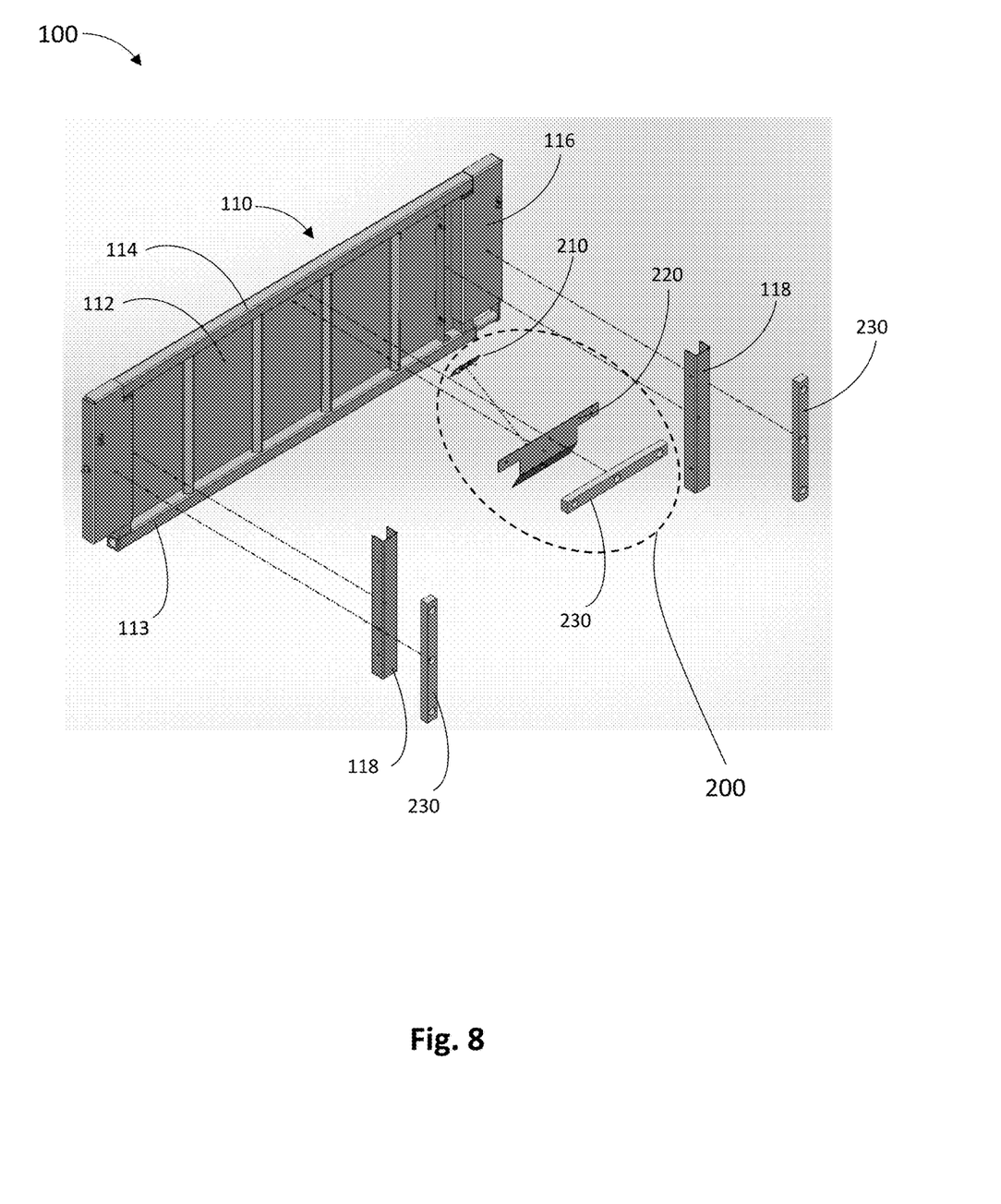
FIG. 8 is an exploded perspective view of a rearward facing camera assembly of a liftgate assembly according to one embodiment of the present invention.
Figure 9:
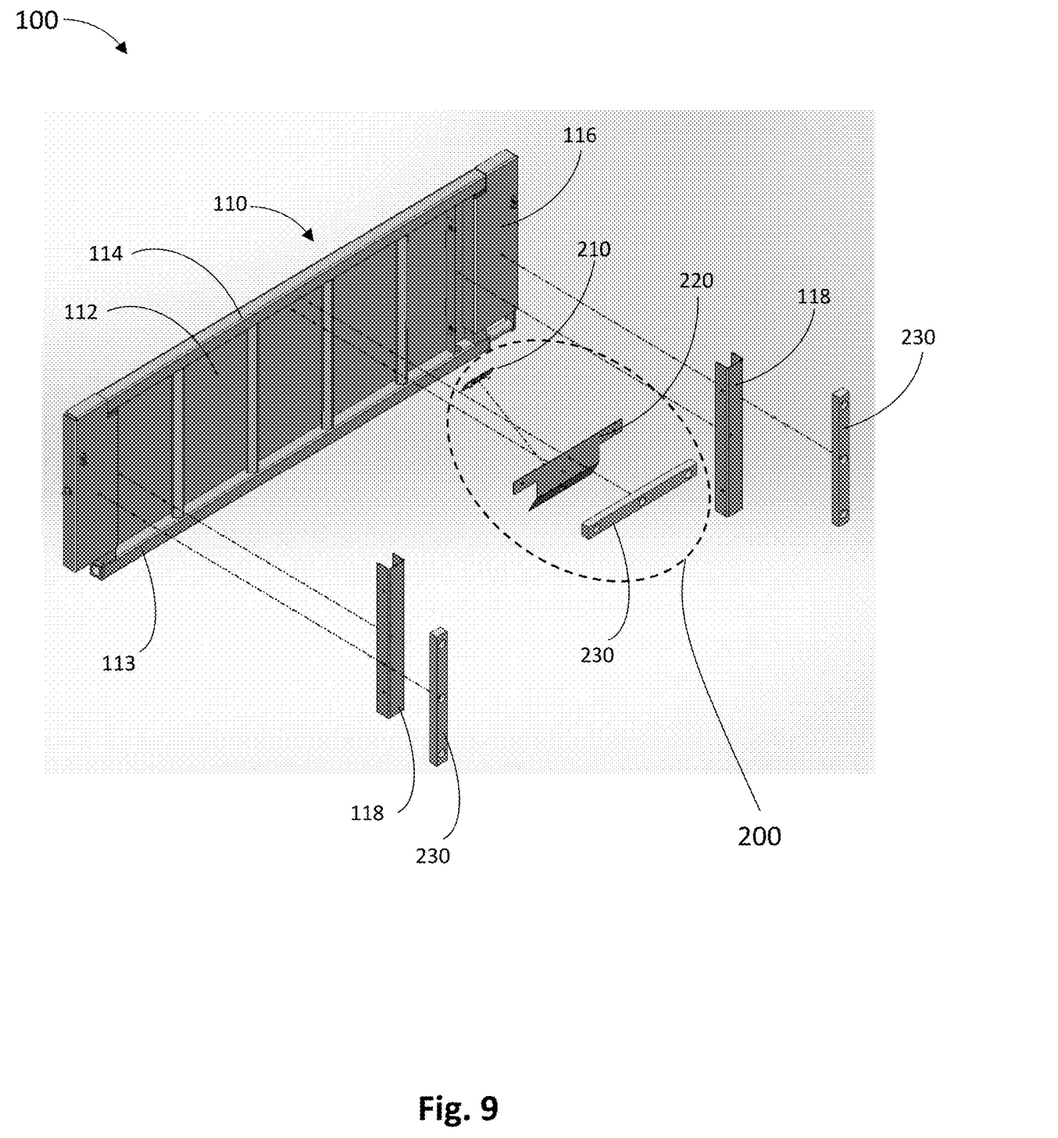

In some embodiments, the mounting points are configured generally to support a wide range of manufacturer suggested camera mounting positions. In some embodiments, the mounting points are configured for a specific vehicle or brand of vehicles, such as to comply with a particular manufacturer's suggested camera mounting positions. The mounting points are configured such as to secure the camera in a position which complies with rear visibility standards, where such rear visibility standards include, but are not limited to, field-of-view, object size requirements, extra features, and the like. In some embodiments, the position of the camera is within the manufacturer's guidelines when the platform is in the stowed configuration. FIG. 8 shows mounting holes according to one embodiment.

In some embodiments, a single receiving element may have mounting points positioned such that the camera is not necessarily mounted in a recommended or exact manufacturer mounted position, depending on the mounting points utilized in combination with the particular vehicle. For example, in some embodiments, only one mounting point may be positioned such that the camera is mounted to the vehicle at the specific manufacturer's recommended mount position. In other words, one mounting point may be configured to secure the camera at the specific manufacturer's recommended mount position, and a second or third mounting point may be positioned such that the camera may or may not comply with some other specifications outlined by the manufacturer. As a result, the camera may be secured to multiple non-recommended mount positions using the receiving element and the same mounting bracket. In some embodiments, the same mounting bracket may be used at a recommended mount position and at a plurality of non-recommended mount positions.

In some embodiments, the receiving element may be configured such that the camera is secured to a preselected mount position without the need for multiple mounting brackets or without the need for any mounts at all. For example, the camera, in some embodiments, secures directly to one or more of the first surface and the first support element, without an intermediate mounting bracket and/or member and/or without a receiving element.

In some embodiments, portions of the liftgate assembly 100 are exposed to the ground or to other abrasive surfaces while in the deployed configuration. For example, the support element may contact the ground while placing an object onto the platform while the platform is in the deployed configuration. In some embodiments, where a camera is mounted at least partially to the support element, the camera is protected from exposure to the ground or other abrasive surface. In some embodiments, a protective member 230 is provided as either part of the camera assembly 200 or as part of the support element. In some embodiments, the protective member 230 is configured to provide protection from rocks or debris on the ground, or from abrasion, or both. In some embodiments, the protective member 230 is in the form of protective panels, grommets, bumpers/feet to ensure sufficient ground clearance that debris on the ground cannot damage the camera, a clear protective cover which may be removable for cleaning or protected from dust build-up, or the like. In some embodiments, the protective element is formed of polycarbonate (PC), polyethylene terephthalate (PET), polyethylene, polypropylene, polyvinyl chloride (PVC), polyurethane (PU), nylon, or other suitable difficult to scratch materials. In some embodiments, the protective element is laminated for additional strength and wear resistance. In some embodiments, the essential purpose of the protective element is to provide a durable surface which extends beyond the dimensions and/or envelope of the camera to provide protection to the camera. In some embodiments, the protective element is affixed to the support element. In some embodiments, the protective element is removable from the support element to allow for cleaning or replacement of the protective element. In some embodiments, the protective element is formed as part of the support element.

The protective element 230 further enables the extension of the platform beyond a deployed configuration without the risk of ground abrasion. In some embodiments, the protective element is configured to extend beyond the edge of the platform in the deployed configuration. An added benefit, in some embodiments, is the protective element is easily cleaned of debris and dirt. In some embodiments, a plurality of protective elements 230 are provided and are associated with at least one of the camera assembly 200 and the left and right structural elements and/or the left and right risers. In some embodiments, where the protective elements are associated with at least the left and right-side structural elements and/or the left the right risers, the protective elements are positioned on an outward facing surface of the structural elements and/or the riser, such as to be positioned closer to the ground, relatively, than the platform when the platform is in a deployed configuration. In this way, the protective elements shield both the platform and the camera assembly from making direct contact with the ground during operation and thereby protect or limit damage due to abrasion.

In some embodiments, the camera 210 is a wireless camera. In such embodiments, consideration for protection of wires associated with the camera is minimal. In some embodiments, the camera is wired. Where the camera includes wires, the wires must also be protected from damage. In some embodiments, a routing path for wiring is included. In some embodiments, the routing path accommodates a wire harness which transmits power to the camera and/or data to and from the camera. In some embodiments, the routing path allows a harness to be routed from the vehicle to the camera.

In some embodiments, the liftgate assembly 100, platform, and/or the structural members provide routing for the camera assembly wiring. In some embodiments, the interior surface includes one or more depression or guide path to accommodate the routing of one or more wiring assembly and/or bundle along the platform. In some embodiments, the routing is proximate one or more of the edges, such as proximate a top edge, and in some embodiments the routing is proximate one or more vertical structural member. In some embodiments, one or more structural members include internal routing paths and/or conduits through which one or more wiring bundle is passed to route the wiring into the vehicle's electrical circuit. Even further, in some embodiments one or more risers includes a routing path, such as a depression or guide or internal routing path. Advantageously, this provides wiring paths that are internal to the platform and/or routed close to the structural members of the platform and therefore does not require the use of exposed wiring harnesses and bundles along the interior surfaces of the platform or wiring paths which may impede the use and function of the liftgate assembly 100.

In some embodiments, one or more wiring bundle is routed within the platform through one or more guide path and/or depression in the platform. In some embodiments, one or more wiring bundle is routed within one or more platform structural member. In some embodiments, one or more wiring bundle is routed within one or more riser. In some embodiments, one or more wiring bundle is routed within the platform through one or more guide path and/or depression in the platform and one or more wiring bundle is routed within one or more platform structural member. In some embodiments, one or more wiring bundle is routed within the platform through one or more guide path and/or depression in the platform and one or more wiring bundle is routed within one or more riser. In some embodiments, one or more wiring bundle is routed within one or more platform structural member and one or more wiring bundle is routed within one or more riser. In some embodiments, one or more wiring bundle is routed within the platform through one or more guide path and/or depression in the platform, one or more wiring bundle is routed within one or more platform structural member and one or more wiring bundle is routed within one or more riser.

In some embodiments, a method of installing a camera assembly 200 on a liftgate assembly 100 is provided. Referring to FIG. 8, In some embodiments, a liftgate assembly 100 is installed on a truck or vehicle. In some embodiments, after a liftgate assembly 100 is installed on the truck, a camera assembly 200 is mounted to the liftgate assembly. In some embodiments, a wiring harness is routed into one main frame upright (such as structural member 116). In some embodiments, the harness is tied to a lifting arm (or riser) connecting the main frame of the platform to a subassembly frame of the liftgate assembly 100. In some embodiments, the harness is tied to the lower lifting arm. In some embodiments, once the harness is routed to the subassembly frame upright, slack is added and hidden within that upright. In some embodiments, the wire is then routed out an access hole drilled into the side of the upright. In some embodiments, consideration is made for interference. In some embodiments, to address interference, one or more wire is routed through a hollowed-out hinge pin. In some embodiments, the platform is pre-modified and/or post-modified with a shortened torsion spring to allow room for the wire to be routed through the hinge. In some embodiments, once the wire is in the platform, the wire is routed along the underside of the platform to the horizontal tube (support element) which forms the 'top' when the platform is stowed. In some embodiments, the wire is routed through this horizontal tube (support element) and out a hole near the middle section, proximate where the camera will be mounted or proximate one or more mounting fixture. In some embodiments, the camera is secured to the mounting fixturing and the harness is plugged into or otherwise engaged with the camera before mounting the fixturing to the liftgate. In some embodiments, at least one of bumpers, a protective screen, protective panels, or other protective element is to protect the wiring and camera. In some embodiments, routing, grommets and/or cable ties are used to protect the wiring from rubbing against any metal parts. In some embodiments, such protective elements for the wiring are not utilized in horizontal tube. In some embodiments, the tube has the flash removed to remove any sharp edges that could cause abrasion to the wires. While FIG. 8 demonstrates a single way of constructing the wiring paths, it will be appreciated that other routing methods and wiring accommodations are considered. For example, in some embodiments, different styles of platform have different designs that may need their own wire routing paths. In some embodiments, an extruded aluminum (EA) platform is utilized. In such embodiments, is it relatively easier to implement wire across the elements widthwise, but a hole may be necessary to route the wire vertically. In some embodiments, the routing path is enabled due to flashing or other protective elements which are attached to one or more surface of the platform, its structural members, one or more riser, the camera assembly, or a combination thereof.

In some embodiments, a protective cover over the camera is included. In some embodiments, the protective cover is translucent, while in some embodiments it is tinted. In some embodiments, the protective cover include one or more cutout, said cutouts being configured to allow for or otherwise align with a line of sight beyond the cover for the camera. In some embodiments, the protective cover is removable, while in others its installment is effectively permanent. In some embodiments, the protective cover is integrated within the structure of the platform and/or liftgate. In some embodiments, the cover is connected to a mechanism, which retracts the cover when in the stowed position and extends the cover when the platform is in the deployed position.

Different styles of platform have different designs that may need their own wire routing paths. For example, an extruded aluminum (EA) platform makes it easy to get wire across widthwise but might need holes cut to route the wire vertically.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Although the foregoing detailed description of the present invention has been described by reference to an exemplary embodiment, and the best mode contemplated for carrying out the present invention has been shown and described, it will be understood that certain changes, modification or variations may be made in embodying the above invention, and in the construction thereof, other than those specifically set forth herein, may be achieved by those skilled in the art without departing from the spirit and scope of the invention, and that such changes, modification or variations are to be considered as being within the overall scope of the present invention. Therefore, it is contemplated to cover the present invention and any and all changes, modifications, variations, or equivalents that fall with in the true spirit and scope of the underlying principles disclosed and claimed herein. Consequently, the scope of the present invention is intended to be limited only by the attached claims, all matter contained in the above description and shown in the accompanying drawings shall be interpreted as illustrative and not in a limiting sense.

Having now described the features, discoveries and principles of the invention, the manner in which the invention is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

What is claimed is:

1. A liftgate assembly, comprising:
   a platform connected to a plurality of risers, the platform configured to be movable between a stowed position and a deployed position, the platform including a perimetral wall and an interior surface, the interior surface including one or more depression to accommodate the routing of one or more wiring assembly along the platform; and
   a camera assembly comprising a rear-view camera and an adjustable mount, the camera assembly mounted to the platform such that the rear-view camera is positioned near the position where a manufacturer-installed camera would be positioned on a tailgate of a pickup truck for which the liftgate assembly is designed for installation upon; and
   a protective member positioned to protect the rear-view camera from exposure to an abrasive surface,
   wherein the adjustable mount includes a plurality of engagement elements; and
   wherein the platform includes routing for the camera assembly wiring.

2. The liftgate assembly of claim 1, wherein the platform includes a receiving element, the receiving element including a plurality of mounting points.

3. The liftgate assembly of claim 2, wherein the receiving element is configured to selectively secure to the mount, the securing achieved through less than all of the mounting points being utilized to receive all of the plurality of engagement elements, thereby establishing a mounting position of the camera assembly.

4. The liftgate assembly of claim 2, wherein the receiving element is configured to secure the camera assembly, and thereby the camera, to multiple different mounting positions, at least one of the mounting positions being a recommended mounting position.

5. The liftgate assembly of claim 1, wherein the depression is proximate a top edge.

6. The liftgate assembly of claim 5, wherein one or more structural members include internal routing paths through which one or more wiring bundle is passed to route the wiring into a vehicle's electrical circuit.

7. The liftgate assembly of claim 6, wherein one or more riser includes an internal routing path.

8. A camera assembly for a liftgate, the camera assembly comprising:
- a camera;
- a bracket configured to support the camera;
- an adjusting member attached to the camera configured to rotate and thereby adjust the position of a camera with respect to the liftgate; and
- a first protective member positioned relative to the camera, the first protective member being positioned closer to a lower elevation surface than the camera when the liftgate is in a deployed position.

9. The camera assembly of claim 8, wherein the first protective member is positioned on an outward facing side of the bracket.

10. The camera assembly of claim 9, wherein the bracket is positioned on an outward facing side of a liftgate support element.

11. The camera assembly of claim 8, wherein the first protective member is positioned on an outward facing side of a liftgate support element.

12. The camera assembly of claim 8, further comprising second and third protective members, the second and third protective members positioned on outward facing sides of respective support elements of the liftgate.

13. The camera assembly of claim 12, wherein the first protective member is positioned on an outward facing side of the bracket.

14. A method of installing a camera assembly, the method comprising:
- mounting a camera assembly to a liftgate assembly;
- routing a wiring harness into one main frame upright;
- tying the harness to a lifting arm connecting a main frame of a platform of the liftgate assembly to a subassembly frame of the liftgate assembly;
- adding slack to the harness;
- hiding the slack within the upright;
- routing the harness out an access hole drilled into a side of the upright; and
- routing wire through a hollowed-out hinge pin.

15. The method of claim 14, wherein the camera is secured to a mounting fixturing and the harness is engaged with the camera before mounting the mounting fixturing to the liftgate.

16. The method of claim 15, further comprising attaching to the liftgate assembly at least one protective element to protect the wiring and camera.

* * * * *

UNITED STATES PATENT AND TRADEMARK OFFICE
CERTIFICATE OF CORRECTION

PATENT NO. : 12,291,151 B2
APPLICATION NO. : 17/962064
DATED : May 6, 2025
INVENTOR(S) : Kojic et al.

Page 1 of 1

It is certified that error appears in the above-identified patent and that said Letters Patent is hereby corrected as shown below:

On the Title Page

Column 1, Item (72), in "Inventors", Line 1, delete "Council Bluff," and insert -- Council Bluffs, --, therefor.

Column 1, Item (51), under "Int. Cl.", Lines 2-3, delete "*B60J 5/10        (2006.01)*
*B60R 11/04       (2006.01)*".

Column 1, Item (51), under "Int. Cl.", Line 5, delete "*B60R 11/00        (2006.01)*".

Column 2, Item (57), under "Abstract", Line 7, delete "assemble" and insert -- assembly --, therefor.

In the Specification

In Column 1, Line 27, delete "(GWR)" and insert -- (GAWR) --, therefor.

In Column 1, Line 27, delete "lbs." and insert -- lbs., --, therefor.

In Column 1, Line 29, delete "for" and insert -- of --, therefor.

In Column 2, Line 44, delete "a," and insert -- an --, therefor.

In Column 8, Line 50, delete "In" and insert -- in --, therefor.

In Column 10, Line 7, delete "any and all" and insert -- any --, therefor.

In Column 10, Line 8, delete "with in" and insert -- within --, therefor.

Signed and Sealed this
Twenty-fourth Day of June, 2025

Coke Morgan Stewart
*Acting Director of the United States Patent and Trademark Office*